(12) United States Patent
Enderich

(10) Patent No.: US 10,730,406 B2
(45) Date of Patent: Aug. 4, 2020

(54) ELECTRONIC CONTROL SYSTEM FOR A VEHICLE SEAT

(71) Applicant: HELLA GmbH & Co. KGaA, Lippstadt (DE)

(72) Inventor: Mark A. Enderich, Riverview, MI (US)

(73) Assignee: HELLA GmbH & Co. KGaA, Lippstadt (DE)

( * ) Notice: Subject to any disclaimer, the term of this patent is extended or adjusted under 35 U.S.C. 154(b) by 19 days.

(21) Appl. No.: 16/055,599

(22) Filed: Aug. 6, 2018

(65) Prior Publication Data

US 2019/0047442 A1 Feb. 14, 2019

Related U.S. Application Data

(60) Provisional application No. 62/542,479, filed on Aug. 8, 2017.

(51) Int. Cl.
*B60N 2/02* (2006.01)
*B60N 2/20* (2006.01)
*B60N 2/22* (2006.01)
*G01D 5/14* (2006.01)

(52) U.S. Cl.
CPC ......... *B60N 2/0232* (2013.01); *B60N 2/0244* (2013.01); *B60N 2/206* (2013.01); *B60N 2/2227* (2013.01); *G01D 5/142* (2013.01); *B60N 2002/0236* (2013.01); *B60N 2002/0272* (2013.01)

(58) Field of Classification Search
CPC .............................. B60N 2/22; B60N 2/0232; B60N 2002/0272; B60N 2/914; B60N 2002/0268
See application file for complete search history.

(56) References Cited

U.S. PATENT DOCUMENTS

| | | | | |
|---|---|---|---|---|
| 6,339,302 B1 * | 1/2002 | Greenbank | .......... | B60N 2/0228 318/103 |
| 7,750,588 B2 * | 7/2010 | Zhang | .................... | G05B 19/21 318/264 |
| 2002/0113478 A1 * | 8/2002 | Kasahara | ........... | B64D 11/0641 297/362.11 |
| 2006/0232896 A1 * | 10/2006 | Maue | .................... | H02H 7/0851 361/23 |
| 2007/0203628 A1 * | 8/2007 | Yoshida | ............... | B60N 2/0232 701/49 |

(Continued)

*Primary Examiner* — Jorge L Carrasquillo
*Assistant Examiner* — Zoheb S Imtiaz
(74) *Attorney, Agent, or Firm* — Warner Norcross + Judd LLP

(57) ABSTRACT

An electronic control system for vehicle seatbacks is provided. The electronic control system can detect an obstruction or a motor stall by comparing the energy consumed by a seatback motor with an obstruction threshold and a stall threshold, the threshold being selected based upon the position of the seatback. The electronic control system can additionally control the synchronous folding of two or more adjacent powered seatbacks. The electronic control system causes the motor for the lagging seatback to receive a maximum driving voltage and causes the motor for the leading seatback to receive a partial driving voltage. Once the seatbacks are in alignment, a normal driving voltage is provided to both motors.

8 Claims, 7 Drawing Sheets

(56) References Cited

U.S. PATENT DOCUMENTS

| | | | | |
|---|---|---|---|---|
| 2007/0241704 A1* | 10/2007 | Shimomura | ......... | G05B 19/0428 318/280 |
| 2012/0180391 A1* | 7/2012 | McKee | ......... | H02P 29/028 49/28 |
| 2015/0284983 A1* | 10/2015 | Conner | ......... | E05F 15/60 318/3 |
| 2016/0185259 A1* | 6/2016 | Itou | ......... | B60N 2/0244 318/3 |

* cited by examiner

ELECTRONIC CONTROL SYSTEM FOR A VEHICLE SEAT

CROSS-REFERENCE TO RELATED APPLICATION

This application claims the benefit of U.S. Provisional Application 62/542,479, filed Aug. 8, 2017, the disclosure of which is hereby incorporated by reference in its entirety.

FIELD OF THE INVENTION

The present invention relates to an electronic control system for one or more vehicle seats and, in particular, vehicle seats having foldable seatbacks.

BACKGROUND OF THE INVENTION

Many motor vehicles include electronically controlled seats with multiple loading configurations. For example, certain sport utility vehicles and vans include electronically controlled third-row bench seating. Third-row bench seating can include one or more seats, including for example two seats with a 60-40 split, that fold flat into or onto the floor of the vehicle to provide a generally flat surface when desired by the user.

Third-row seats can be operated by one or more DC motors to vary the inclination angle of the seatback from the stowed position to the deployed position and back again. DC motors for this purpose are typically controlled by a seating electronic control unit (ECU). The seating ECU can control the speed of the DC motor, and consequently the rate at which the seatback changes its angle of inclination, by controlling a pulse-width-modulated drive voltage. The seating ECU can also control the direction of motor rotation, typically with a bi-directional drive voltage, dependent upon the current position in relation to the desired position.

Despite the advantages of the foregoing system, there remains a continued need for the improved control of seatback DC motors. In particular, there remains a continued need to improve the detection of an obstruction or a stall condition during folding of powered seatbacks. In addition, there remains a continued need to improve the synchronous folding of two or more powered seatbacks of a bench seat, optionally in connection with a 60-40 third row seating.

SUMMARY OF THE INVENTION

In accordance with one aspect of the invention, an electronic control system for detecting an obstruction or a motor stall in a powered vehicle seat is provided. The electronic control system includes a processor that is adapted to integrate the power applied to the seatback motor over each motor revolution for comparison with first and second threshold values. The first threshold value corresponds to an obstruction, and the second threshold value corresponds to a motor stall, the second threshold value being greater than the first threshold value. When the energy consumed by the seatback motor over a motor revolution exceeds a threshold value, dependent upon the inclination of the seatback, the processor can terminate power to the seatback motor and/or reverse the direction of the seatback motor.

In accordance with another aspect of the invention, an electronic control system for controlling the synchronous folding of powered vehicle seatbacks is provided. The electronic control system includes first and second seatback motors that are operable to adjust the angle of inclination of first and second seatbacks, respectively, about a common axis of rotation. The electronic control system includes a processor adapted to determine a leading seatback and a lagging seatback based on the difference between the angle of inclination of each seatback. The processor is further adapted to cause the motor for the lagging seatback to receive a maximum driving voltage and cause the motor for the leading seatback to receive a partial driving voltage. Once the seatbacks are in alignment, a normal driving voltage is provided to both motors.

As discussed in greater detail below, the present invention provides an improved system that rapidly detects and responds to obstructions and stalls during folding operations, while also providing the synchronous folding of two or more seatbacks for third-row bench seating. The improved system avoids the need for force transducers for obstruction detection by instead measuring the energy consumed by the seatback motors during folding operations. The improved system also provides for fluid movement of adjoining seatbacks, optionally as a PID algorithm, with effectively no additional hardware.

These and other features and advantages of the present invention will become apparent from the following description of the invention, when viewed in accordance with the accompanying drawings and appended claims.

DETAILED DESCRIPTION OF THE CURRENT EMBODIMENTS

The embodiments as disclosed herein include an electronic control system for powered seatbacks. The electronic control system is adapted to detect an obstruction or a motor stall, discussed in Part I below, and is adapted to control the synchronous folding of powered vehicle seatbacks, discussed in Part II below.

I. Obstruction and Stall Sensing

Figure 1:
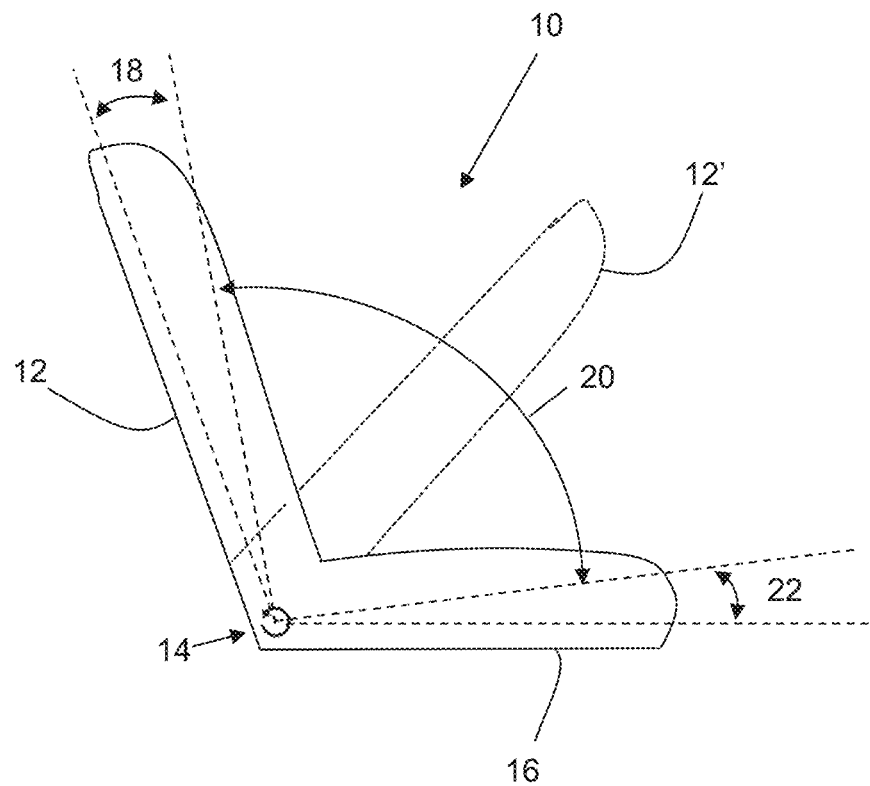
FIG. 1 is a side view of a powered seatback that is adjustable through a range of inclination angles.

Referring to FIG. 1, a powered vehicle seat is illustrated and generally designated 10. The powered vehicle seat 10 includes a seatback 12 that is rotatable about an axis of rotation 14 relative to a seat bottom 16. The seatback 12 is movable by a motor, for example a DC motor, through a range of inclination angles. During folding of the vehicle seat 10, the seatback 12 sweeps through an upper sector 18, an intermediate sector 20, and a lower sector 22, which are preselected for the detection of an obstruction condition or a stall condition as discussed below. As used herein, an "obstruction condition" means a condition in which an object impedes stowing or deploying a vehicle seatback. As used herein, a "stall condition" means an unintended stopping or slowing of a motor while a seatback is being stowed or being deployed, for example when the torque load is greater than the motor shaft torque. The seatback 12 is illustrated in the upper sector 18 in FIG. 1, with the seatback 12' also being shown in phantom in the intermediate sector 20.

Figure 2:
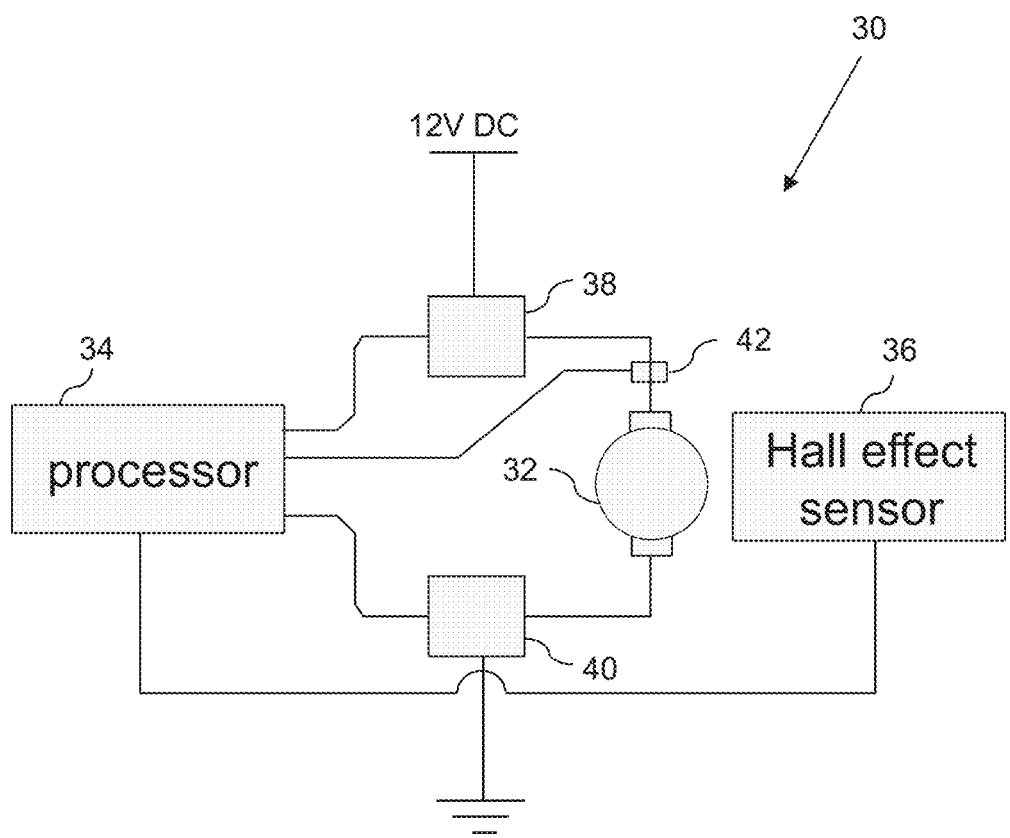
FIG. 2 is a circuit diagram of an electronic control system for controlling movement of the powered seatback of FIG. 1.

Operation of the powered vehicle seat 10 is controlled by an electronic control system, which is illustrated in FIG. 2 and generally designated 30. The electronic control system 30 includes a control circuit to control operation of a motor 32, for example a brushless DC motor. In the illustrated embodiment, the control circuit includes a processor 34, a Hall effect sensor 36, a high side driver 38, and a low side driver 40. The processor 34 is operable to monitor the rotation of the motor 32 based on the output of the Hall effect sensor 36, that is, by tracking each revolution of the motor 32. The processor 34 is additionally operable to control the supply of power (e.g., 12V DC) to the motor 32 through the high side driver 38 and/or the low side driver 40. Though not shown, the high side driver 38 or the low side driver 40 includes a switch to selectively allow a pulse width modulated voltage to the motor 32.

During folding of the vehicle seat 10, the processor 34 integrates the consumed power of the electrical motor 32 per revolution for comparison with an obstruction threshold and a stall threshold. The consumed electrical power is the product of the current (I) and the high side voltage (V), with the high side voltage assumed to remain at 12V DC in the present embodiment. The current can be measured through a high side DC current sensor 42 electrically coupled to the processor 34, or by other current sensors known in the art. Alternatively, the high side driver 38 can provide an output to the processor 34 that is representative of the current drawn by the motor 32. The integral of the consumed power is the energy consumed by the motor, which can be approximated by multiplying the high side voltage (V) with a summation of the current (I), e.g., at 10 millisecond intervals, represented by the following Riemann sum:

$$E = V \Sigma I \cdot \Delta t$$

The energy consumed by the motor for each revolution (E) is stored to computer readable memory and compared with the obstruction threshold or the stall threshold, dependent upon the position of the seatback 12. When the seatback 12 is within the upper sector 18 or the lower sector 22, the energy consumed (E) is compared with the stall threshold. When the seatback 12 is within the intermediate sector 20, the energy consumed (E) is compared with the obstruction threshold, the obstruction threshold being less than the stall threshold. As used herein, "sector" means all or a portion of the range of motion of the seatback 12, the sector being approximated as an arc of a circle.

Figure 3:
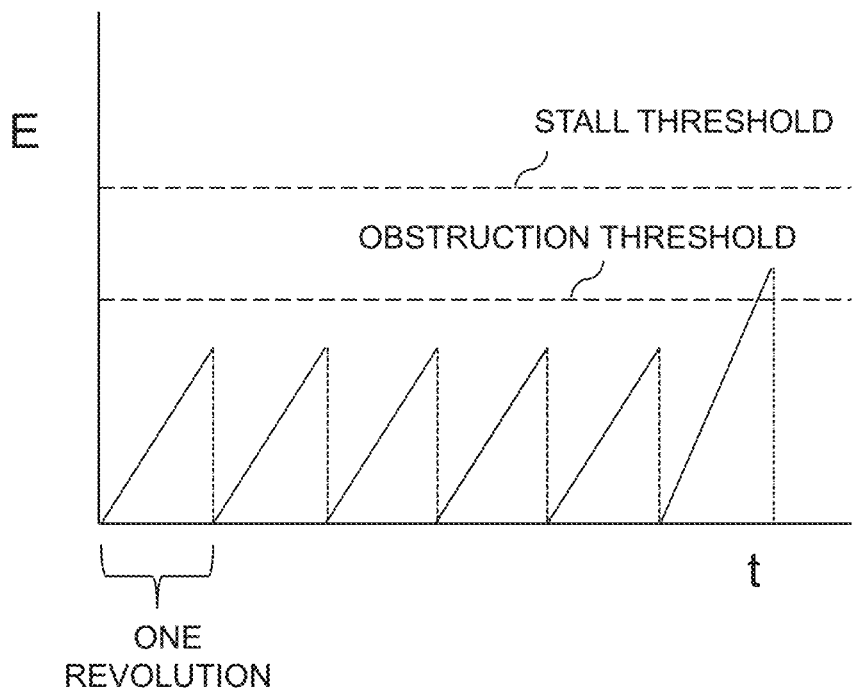
FIG. 3 is a graph illustrating operation of the electronic control system of FIG. 2 for the detection of an obstruction and a motor stall.

These comparisons are graphically illustrated in FIG. 3, in which energy consumed (E) is determined for each revolution in a recurring manner, with the most recently determined energy consumed (E) being compared with a threshold value. The right most saw-tooth depicts the energy consumed by the electric motor (E) for the sixth revolution as being greater than the obstruction threshold. If the seatback 12' is within the intermediate sector 20 as depicted in phantom lines in FIG. 1, the processor 34 would respond by reversing the motor 32. If the seatback 12 is instead within the upper sector 18 (or lower sector 22) as depicted in solid lines in FIG. 1, the processor 34 would continue operation of the motor 32, continuously comparing the energy consumed per revolution against the relevant threshold.

In another embodiment for a seatback 12 rotating from the deployed position to the stowed position, the energy consumed by the motor per revolution is compared with the obstruction threshold as the seatback 12 moves through the upper sector 18 and the intermediate sector 20 to detect an obstruction condition. Once the seatback 12 reaches the lower sector 22, the energy consumed by the motor per revolution is compared with the stall threshold, being greater than the obstruction threshold, in recognition that a lower latching mechanism will expectedly slow movement of the seatback 12 until the seatback 12 reaches the fully stowed position. As the seatback 12 moves from the stowed position to the deployed position, the energy consumed by the motor per revolution is compared with the obstruction threshold as the seatback 12 moves through the lower sector 22 and the intermediate sector 20 to detect an obstruction condition. Once the seatback 12 reaches the upper sector 18, the energy consumed by the motor per revolution is compared with the stall threshold, being greater than the obstruction threshold, in recognition that an upper latching mechanism will expectedly slow movement of the seatback 12 until the seatback 12 reaches the fully deployed position.

To reiterate, the processor 32 can continuously monitor for obstructions or motor stalls with minimal additional hardware and software to what would already be provided for a powered seatback motor. Because an obstruction or a motor stall would be expected to cause the energy consumed by the motor to increase, these conditions can be rapidly detected by the processor 34 for immediate corrective action. This feature can be used in combination with, or separately from, the synchronous folding of powered vehicle seatbacks as discussed below.

II. Synchronous Seat Movement

Figure 4:
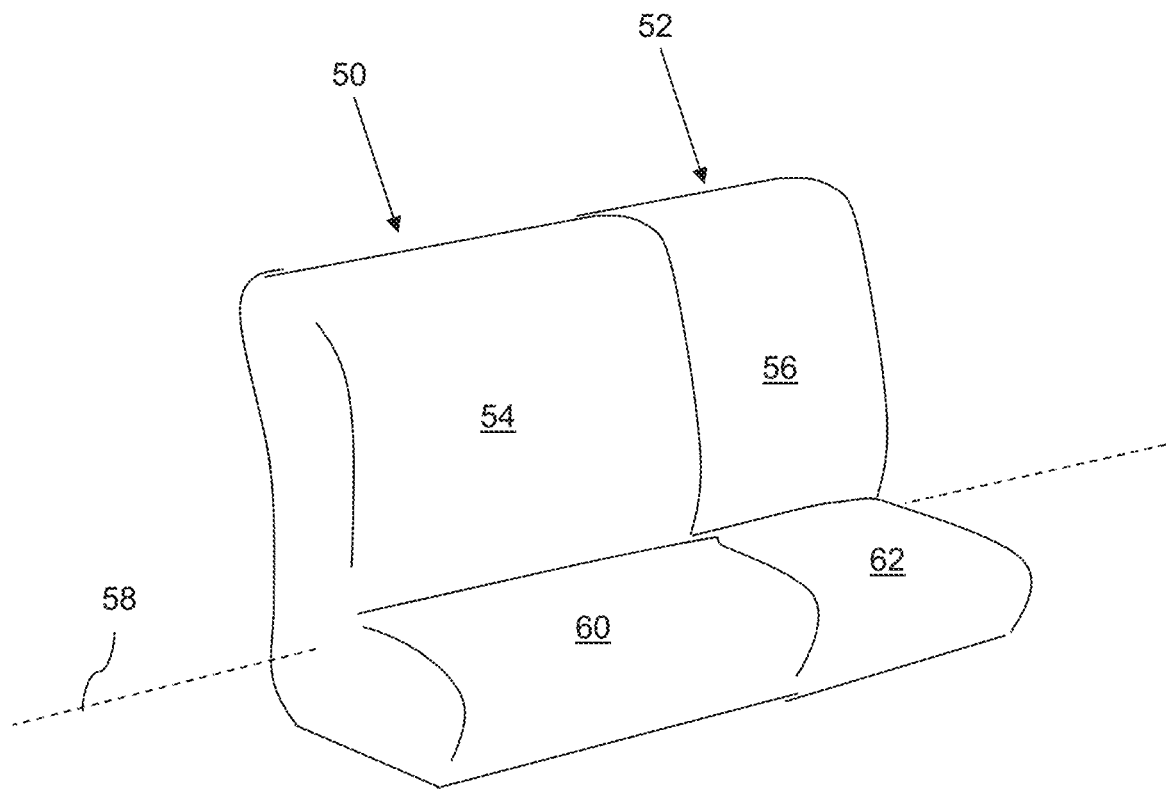
FIG. 4 is a perspective view of adjacent powered seatbacks that are adjustable through a range of inclination angles.

Referring to FIG. 4, adjacent powered vehicle seats 50, 52 are illustrated as having seatbacks 54, 56 that are rotatable about an axis of rotation 58 through a range of inclination angles. During folding of the vehicle seats 50, 52 from the deployed position to the stowed position, the seatbacks 54, 56 sweep forwardly until the seatbacks 54, 56 fold onto the respective seat bottoms 60, 62. Similarly, the seatbacks 54, 56 are moveable in the reverse direction from the stowed position to the fully deployed position depicted in FIG. 4. The powered vehicle seats 50, 52 are third row bench seats in the illustrated embodiment, but can be configured differently in other embodiments as desired.

Figure 5:
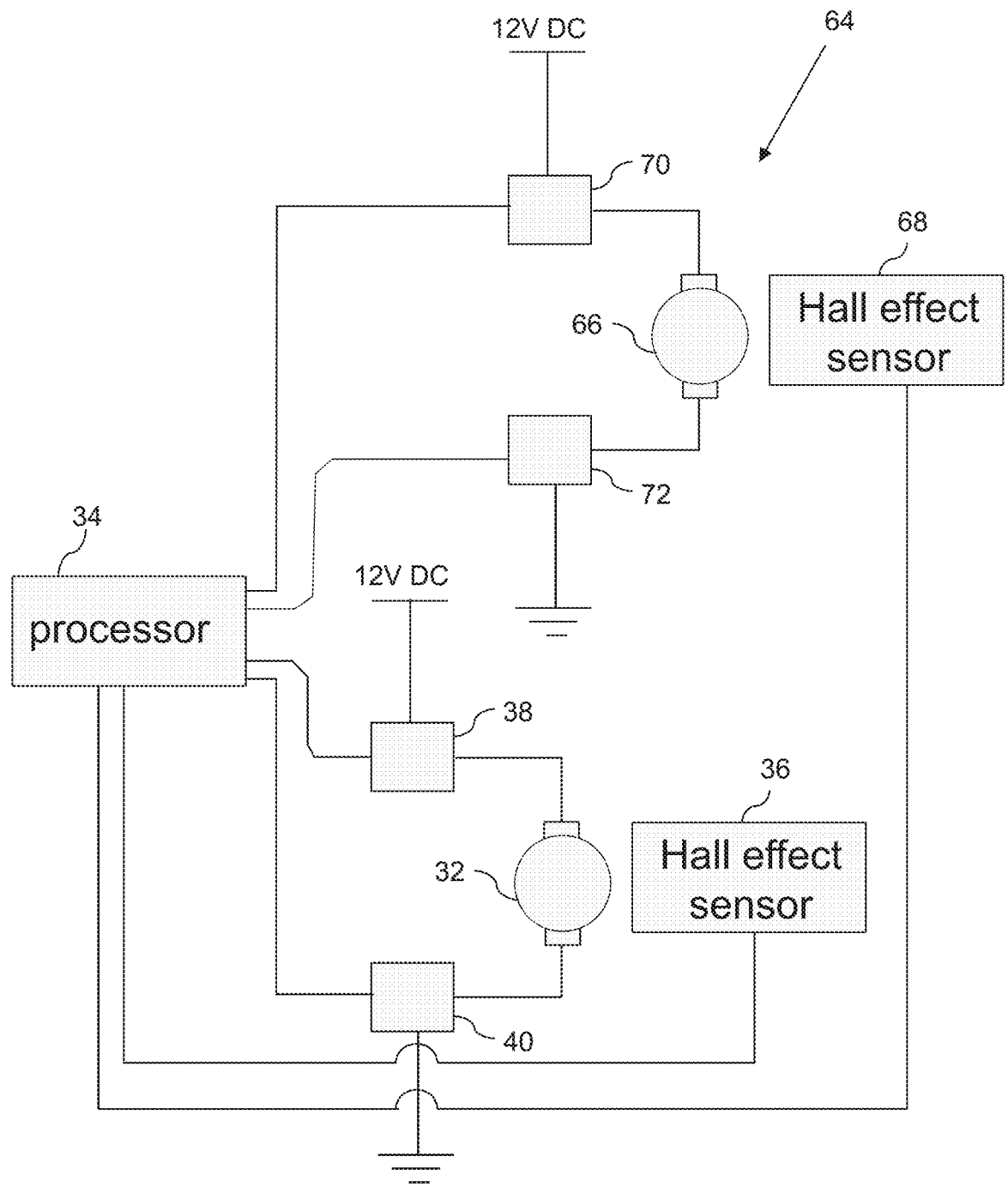
FIG. 5 is a diagram of an electronic control system for synchronous folding of the powered seatback of FIG. 4.

Operation of the powered vehicle seats 50, 52 is controlled by an electronic control system, which is illustrated in FIG. 5 and generally designated 64. The electronic control system 64 of FIG. 5 is similar in structure and in function to the electronic control system 30 of FIG. 2, and includes an additional motor 66, Hall effect sensor 68, high side driver 70, and low side driver 72. The processor 34 is operable to monitor the rotation of each motor 32, 66 based on the output of the Hall effect sensors 36, 68, that is, by tracking each revolution of the motors 32, 66. The processor 34 is additionally operable to control the supply of power (e.g., 12V DC) to the motors 32, 66 through the high side drivers 38, 70 and/or the low side drivers 40, 72. By modulating the pulse width of the 12V DC voltage, the processor 34 is operable to provide each motor 32, 68 with a maximum driving voltage (100% duty cycle), a zero driving voltage (0% duty cycle), or a partial driving voltage (1%-99% duty cycle).

Figure 6:
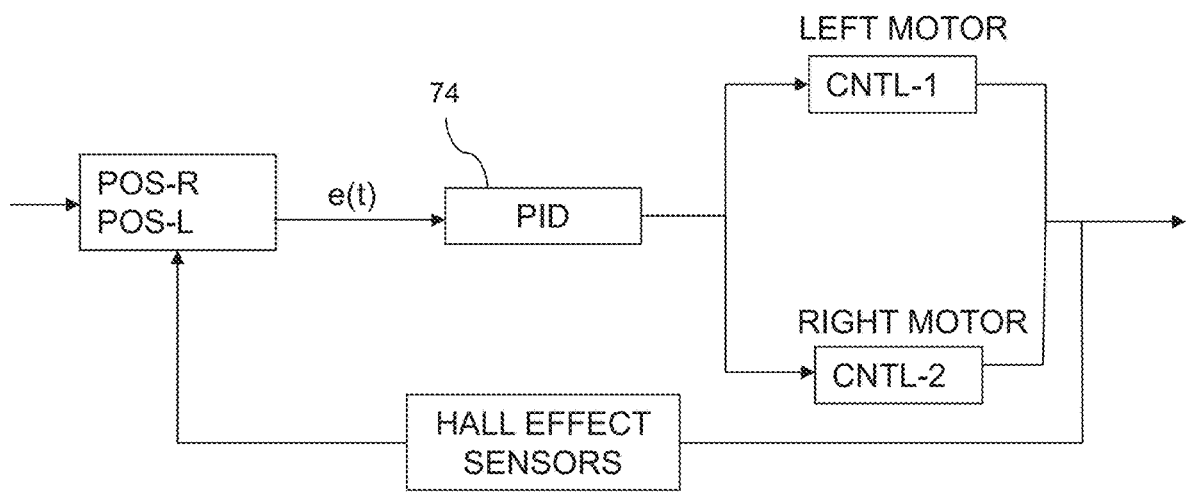
FIG. 6 is a PID control loop for the synchronous folding of the vehicle seatbacks of FIG. 4.

As shown in FIG. 6, the processor 34 includes a PID control loop to synchronously sweep the seatbacks 54, 56 forward and rearward. The PID control loop determines an error value based on the output of the Hall effect sensors 36, 68. Because each motor revolution provides an indirect measurement of the change in inclination angle of the seatbacks, the processor 34 is operable to track the progression of each seatback 54, 56 and thus determine the difference in inclination angle between each seatback 54, 56. The difference in inclination angle between a leading seatback and a lagging seatback is the error value e(t). Based on this error value, a PID module 74 determines a left control output and a right control output. Where the left seatback 56 is the leading seatback and the right seatback 54 is the lagging seatback, the left control output provides the left motor with a partial drive voltage and the right control output provides the right motor with a maximum drive voltage. Similarly, where the right seatback 54 is the leading seatback and the left seatback 56 is the lagging seatback, the right control output provides the right motor with a partial drive voltage and the left control output provides the left motor with a maximum drive voltage.

The partial drive voltage is achieved in the current embodiment with pulse modulation of the 12V DC supply voltage. By reducing the drive voltage to the leading seatback motor, the lagging seatback is allowed to effectively catch up to the leading seatback. The amount of the partial drive voltage is determined by the PID module 74 and is graphically indicated in FIG. 7. As the error value e(t) is reduced, the partial drive voltage to the leading seatback motor increases. When the error value e(t) is zero, meaning the seatbacks are moving in alignment with each other, each seatback receives a maximum driving voltage.

Figure 7:
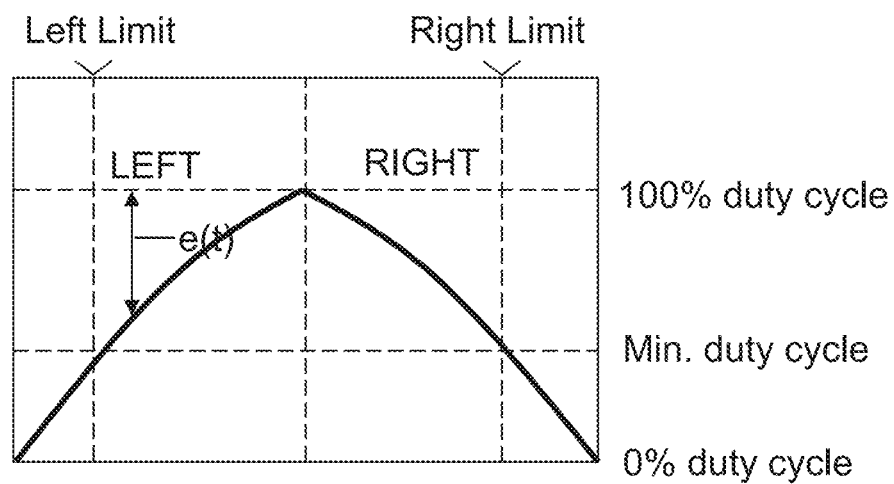
FIG. 7 is a graph illustrating the partial drive voltage to the leading seatback motor in accordance with the PID control loop of FIG. 6.

As also shown in FIG. 7, the partial driving voltage for the leading seatback motor includes a minimum driving voltage. The minimum driving voltage is provided to the leading seatback motor despite the error value e(t) being significant, e.g., left of the "Left Limit" or right of the "Right Limit." In this respect, the leading seatback continues its sweep with a minimum speed while the lagging seatback continues its sweep at a maximum speed. Once the error value e(t) reduces sufficiently, e.g., to between the "Left Limit" line and the "Right Limit" line, the driving voltage for the leading seatback motor gradually increases based on the output of the PID module 74.

The above description is that of current embodiments of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. An electronic control system for a vehicle seat comprising:
    a motor operable to adjust an angle of inclination of a seatback; and
    a control circuit to control operation of the motor during a stall condition and during an obstruction condition, the control circuit including:
        a sensor to detect angular movement of the motor,
        a processor in electrical communication with the sensor, wherein the processor includes machine readable instructions that, when executed, cause the processor to determine the energy consumed by the motor during adjustment of the angle of inclination of the seatback and cause the processor to arrest or reverse rotation of the motor in response to the energy consumed by the motor per motor revolution being at least equal to a predetermined threshold, wherein the predetermined threshold varies between a stall threshold and an obstruction threshold dependent upon the angle of inclination of the seatback, and wherein the processor is operable to compare the energy consumed by the motor with the obstruction threshold when the angle of inclination of the seatback is within an intermediate sector.

2. The electronic control system of claim 1 wherein the stall threshold is greater than the obstruction threshold.

3. The electronic control system of claim 1 wherein the processor is operable to compare the energy consumed by the motor with the stall threshold when the angle of inclination of the seatback is within a lower sector less than the intermediate sector.

4. The electronic control system of claim 1 wherein the processor is operable to compare the energy consumed by the motor with the stall threshold when the angle of inclination of the seatback is within an upper sector greater than the intermediate sector.

5. The electronic control system of claim 1 wherein the processor is operable to reverse the motor direction in response to the energy consumed by the motor per motor revolution being at least equal to the predetermined threshold.

6. The electronic control system of claim 1 wherein the processor is operable to terminate power to the motor in response to the energy consumed by the motor per motor revolution being at least equal to the predetermined threshold.

7. The electronic control system of claim 1 wherein the sensor is a Hall effect sensor having an output electrically connected to the processor.

8. The electronic control system of claim 1 further including a current sensor having an output electrically coupled to the processor for measuring the current drawn by the motor.

* * * * *